United States Patent [19]

Jennings

[11] Patent Number: 5,546,257
[45] Date of Patent: Aug. 13, 1996

[54] PROTECTION AND CLEANING DEVICE FOR A DISK DRIVE

[76] Inventor: Gordon Jennings, 2562 E. Glade Ave., Mesa, Ariz. 85204-6208

[21] Appl. No.: 295,524

[22] Filed: Aug. 24, 1994

[51] Int. Cl.$^6$ .................................................. G11B 5/41
[52] U.S. Cl. ...................... 360/128; 360/97.04; 360/137
[58] Field of Search .................................. 360/128, 133, 360/137, 97.04

[56] References Cited

U.S. PATENT DOCUMENTS

| | | | |
|---|---|---|---|
| 4,377,831 | 3/1983 | Davis | 360/128 |
| 4,498,114 | 2/1985 | Davis | 360/128 |
| 4,558,386 | 12/1985 | Kara | 360/128 |
| 4,622,617 | 11/1986 | Fritsch | 360/128 |
| 4,630,157 | 12/1986 | Bond | 360/128 |
| 4,663,686 | 5/1987 | Freeman | 360/128 |
| 4,682,257 | 7/1987 | Neuman | 360/128 |
| 4,704,648 | 11/1987 | Monia | 360/128 |
| 4,754,356 | 6/1988 | Cooper | 360/128 |
| 4,868,699 | 9/1989 | Kingsbury | 360/128 |
| 4,868,700 | 9/1989 | Fritsch | 360/128 |
| 4,916,564 | 4/1990 | Fritsch | 360/128 |
| 4,969,061 | 11/1990 | Patterson | 360/133 |
| 5,012,377 | 4/1991 | Siddio | 360/128 |
| 5,075,919 | 12/1991 | Rogers | 15/210 R |
| 5,119,256 | 6/1992 | Nakamats | 360/128 |
| 5,122,918 | 6/1992 | Chao | 360/133 |
| 5,148,337 | 9/1992 | Cullen et al. | 360/97.04 |
| 5,150,268 | 9/1992 | Abe | 360/128 |
| 5,223,329 | 6/1993 | Amann | 428/198 |
| 5,227,226 | 7/1993 | Rzasa | 428/219 |
| 5,235,485 | 8/1993 | Martin | 360/128 |
| 5,453,893 | 9/1995 | Nouchi et al. | 360/128 |

OTHER PUBLICATIONS

IBM TDB, vol. 22, No. 1 (Jun. 1979), p. 347. J. M. Levine.

*Primary Examiner*—John H. Wolff
*Assistant Examiner*—William J. Klimowicz
*Attorney, Agent, or Firm*—Parsons & Associates; Robert A. Parsons; Don J. Flickinger

[57] ABSTRACT

A non-rotational, air filtering, head cleaning, and head cushioning device for a disk drive comprising a member and rigid support structure adapted to allow insertion of the device into a disk drive. The member, preferably comprising urethane-impregnated felt cloth, has a central aperture to avoid contact with a drive spindle of the disk drive when seated within the disk drive. When left in the disk drive, the device filters air entering the drive, cleans the heads whenever the drive checks if a disk is present, and cushions the heads whenever the drive is moved.

10 Claims, 1 Drawing Sheet

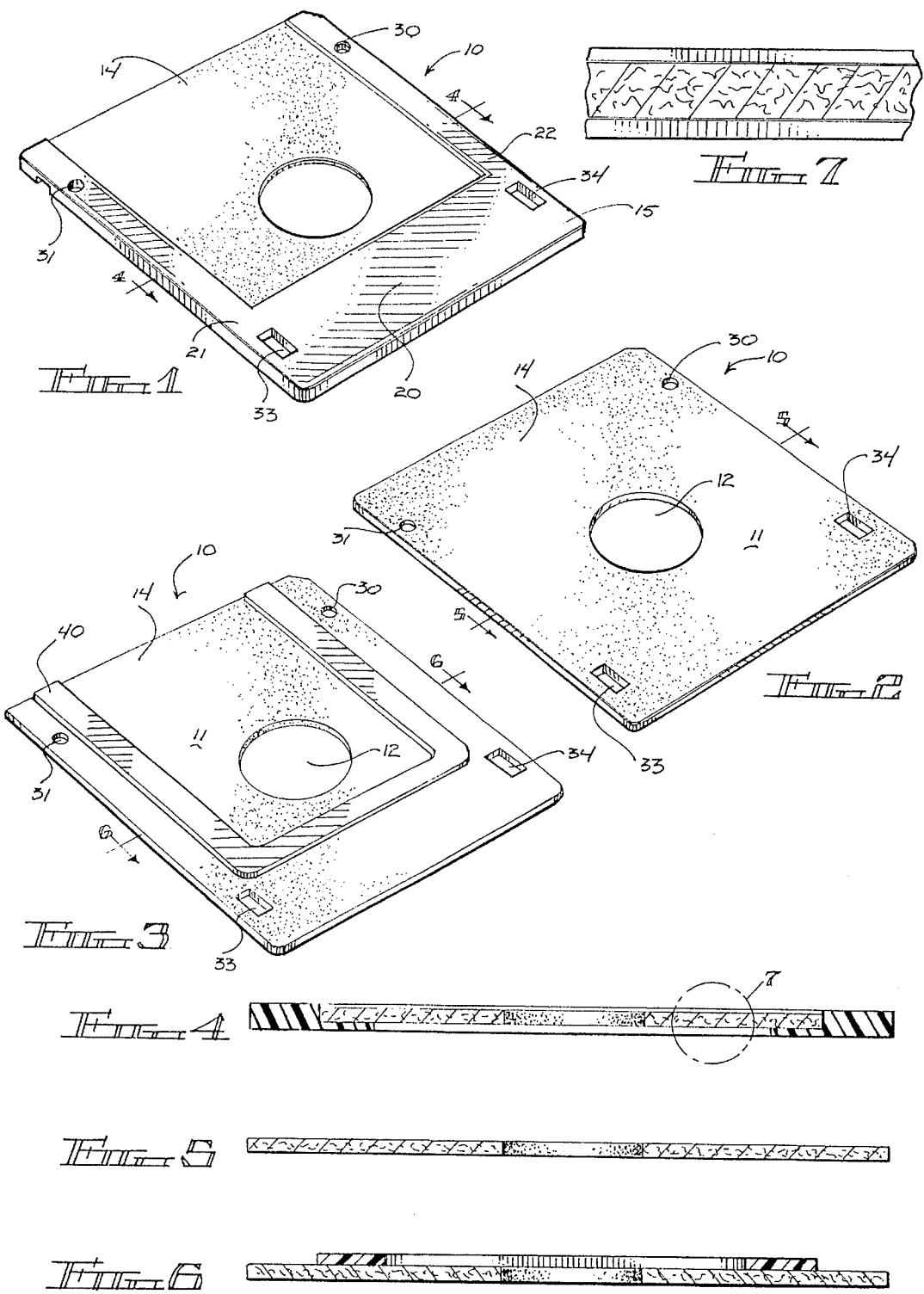

PROTECTION AND CLEANING DEVICE FOR A DISK DRIVE

BACKGROUND OF THE INVENTION

This invention relates generally to a protection and cleaning device for information storage and retrieval devices heads, such as floppy disk drives, hard disk drives, compact disk drive units, and the like. More particularly, this invention relates to a non-rotational air filtering, head cleaning, and head cushioning device for a disk drive comprising a member and rigid support structure adapted to allow insertion of the device into a disk drive.

The heads of disk drives accumulate dust particles and debris from the surface of the disks they read. The heads may also adsorb and become coated with contamination that evaporates from the surface of the storage media. If the heads are not cleaned, data transferred to or from the disk may be transferred incorrectly or not at all. Therefore, to ensure reliable operation, the disk drive heads require periodic cleaning.

Airborne dust particles also accumulate on components within disk drives and computers. Exacerbating the problem, many computers require air to be drawn through the drive into the computer to keep the components cool. If the air is not filtered these particles can deleteriously affect mechanical, electrical, and heat transfer properties of the components.

Finally, in today's age of portable computers, disk drives are often subjected to rugged conditions. The heads of disk can be damaged when a disk drive is moved and the cardboard inserts originally shipped with many drives do not provide adequate cushion for the sensitive heads. It would be advantageous to not only protect the heads from contamination, but to cushion them as well.

Devices have thus been developed to clean the heads, although no air filtration means or cushioning is provided. One form of cleaning device for disk drives known in the prior art is a round, fibrous cleaning disc which is mounted for rotatable movement within a square jacket shaped similarly to a jacket housing a data disk. A cleaning solution may be applied through openings in the surface of the jacket prior to insertion of the cleaning tool into a disk drive. After insertion, the computer is activated so that the drive spindle engages and then rotates the cleaning disk across the heads. A disadvantage of this type of cleaning device is that the cleaning disk, because it rotates in the same direction as the data disk, does little more than remove and then redeposit the contaminants and debris on the leading edge of the heads. The heads, therefore, are not effectively cleaned.

Also disadvantageous is that the same peripheral area of the cleaning disk is reused for each new cleaning operation which results in redeposition of the contaminants removed in a previous cleaning onto the heads. Further, the abrasive friction from the spinning disk can cause wear on the surface of the heads and the flexible jacket portion of such cleaning devices has a tendency to buckle and jam when it is inserted into or released from the disk drive. No means for air filtration or cushioning is provided.

Cleaning devices employing a reciprocating motion also are known. In U.S. Pat. No. 4,622,617, Fritsch teaches a cleaning device that uses an automatic spring and cam system, or a manual spring and lever system, housed within a jacket to move the cleaning material across the heads in a reciprocating motion. U.S. Pat. No. 4,663,686 issued to Freeman et al. teaches a cleaning device with a lever, a spring, and rotatable wiper assembly in a jacket. The cleaning surface is manually rotated back and forth within the jacket across the heads. These cleaning devices have several internal moving parts which may fail or require maintenance. Like other prior art, no means for air filtration or cushioning is provided.

U.S. Pat. No. 4,868,700 issued to Fritsch shows a non-rotational plate member with a surface mounted cleaning fabric. Upon insertion, the drive spindle of the computer engages a rotating annular disk of the cleaning device, simulating a rotating data disk, to indicate to the computer that a disk is present. Subsequent execution of a previously stored computer program then causes the heads to move backwards and forwards over the stationary cleaning surface. Use of this device requires that the computer be turned on and a compatible software program already be stored in the computer's memory. The computer may not be able to load the program if the drive is failing because its heads are dirty. Again, no means for air filtration or cushioning is provided.

U.S. Pat. No. 5,235,485 issued to Martin discloses a paddle-shaped device for manually cleaning the heads of a disk drive. The device is made of hard plastic with a small strip of fibrous material attached along a radius of the disk at the disk's read position. The disk is manually moved longitudinally back and forth to clean the heads. This device is not constructed of air-filtering material and it is not designed to be left in a disk drive to cushion and protect the heads when the drive is not in use.

U.S. Pat. No. 5,223,006 to Moran, III discloses an air cleaner box for a computer. The entire computer is placed within the box and an electronic or other type of air cleaner removes airborne particles before they reach the computer within the enclosure. This device is necessarily large enough to contain an entire computer within it and it restricts access to disk drives, buttons, and other items attached to the computer. The device is not capable of cleaning the heads.

Accordingly, it is an object of the present invention is to provide an improved device for cleaning the heads of a disk drive. Another object of the present invention is to provide a device for cushioning the heads of and filtering the air of a disk drive. A further object of the present invention is to provide a device that automatically cleans the heads of a disk drive each time the disk is inserted, without requiring the use of a previously loaded computer program. A still further object of the present invention is to provide a non-rotational device that cleans the heads of a disk drive in the direction of normal head motion. A still further object of the present invention is to provide a disk drive head cleaning device that has no moving parts.

SUMMARY OF THE INVENTION

The present invention provides a non-rotatable, air filtering, head cleaning, and head cushioning device for a disk drive comprising a member and rigid support structure adapted to allow insertion of the device into a disk drive. The member, preferably comprising urethane-impregnated felt cloth, has a central aperture to avoid contact with a drive spindle of the disk drive when fully seated within the disk drive. Preferably, the member is attached to a rigid support structure adapted to be fully seated within the disk drive when fully inserted into the receiving area to allow smooth insertion and removal of the device. Alternatively, the member alone can be used without a support structure. The member, or member and support structure, substantially fills the drive cavity. The device has notched areas on its outer periphery which allow clearance of the internal structures of the disk drive.

The device is inserted into and preferably left in the drive when the drive is not in use. Airborne particles entering the drive are filtered by the member. Whenever the disk is inserted, the heads traverse a portion of the member and are cleaned in the direction of normal head motion. When not in use, the drive's heads rest upon the member and are protected and cushioned.

BRIEF DESCRIPTION OF THE DRAWINGS

FIG. 1 is a perspective view of the device according to the preferred embodiment of the invention.

FIG. 2 is a perspective view of the device according to another embodiment of the invention.

FIG. 3 is a perspective view of the device according to a third embodiment of the invention.

FIG. 4 is a cross-sectional view of the device of FIG. 1 along line 4—4.

FIG. 5 is a cross-sectional view of the device of FIG. 2 along line 5—5.

FIG. 6 is a cross-sectional view of the device of FIG. 3 along line 6—6.

FIG. 7 is a cross-sectional view of the device, an enlargement of FIG. 4.

DETAILED DESCRIPTION OF THE INVENTION

FIGS. 1 to 6 illustrate three alternative embodiments of devices according to the invention, denoted generally as 10. In the preferred embodiment of the present invention illustrated in FIGS. 1 and 4, the device comprises a member 11 for filtering the air, cleaning the heads, and cushioning the heads of a disk drive, made preferably of urethane-impregnated felt cloth, having an aperture 12 to avoid contact with a drive spindle of the disk drive. The member has a head receiving area 14 where at least one head of the disk drive comes in contact with the member 11 when it is inserted into the drive. The member is attached to a rigid support structure 15 adapted for insertion into and removal from a receiving area of the disk drive.

In this embodiment the rigid support structure 15 has a base 20 and two narrow side bars 21 and 22 forming a U-shape to surround the member 11. As illustrated in FIG. 4, the rigid support structure has an internal edge 23 that is adapted to receive the member. Preferably the rigid support structure is constructed of the same material and has an outer periphery of substantially similar shape to a disk jacket of a data disk.

During standard operation of a disk drive, a data disk is inserted and the heads mechanically move to contact the disk regardless of whether the computer is on or off. If the computer is on, the disk drive senses that the disk is present and tries to read, or boot, the disk. However, if the disk cannot be read, for example if the disk is not a data disk, a read error is given and the disk is ejected. For the present device, it is advantageous to leave the device in the disk drive so that the disk can filter the air and cushion the heads. Therefore, the device is notched in several locations in order to defeat the disk-presence sensors within a disk drive.

Multiple notches are made into the device to defeat the disk sensors such that the computer does not try to read or eject the disk. Notches 30 and 31 are formed in each of the side bars near the leading edge of the disk. The placement of these notches corresponds to that of similar notches on standard data disks where the disk seats onto alignment pegs within the drive. For drives used with Macintosh computers and the like, another notch 32 (shown only on FIG. 1) is also formed on the side bars of the disk near the leading edge. These notches are typically semi-circular, with the diameter of the notch coinciding with the periphery of disk. In the preferred embodiment for easiest manufacturing, the notches are cut completely through the U-shaped jacket thereby forming holes. Alternatively, the notches may be cut only partially through the device, forming an indentation, as opposed to a hole.

The device has two more notches 33 and 34 at the rear edge of the device, placed forward of the location of standard write-enable and high-density notches, respectively. In the preferred embodiment for easiest manufacturing, the notches are cut completely through the U-shaped jacket forming holes.

FIGS. 2 and 5 illustrate an alternative embodiment of the invention comprising a member 11 having a shape substantially similar to a disk jacket adapted for use with the disk drive. The member has an aperture 12 to avoid contact with the drive spindle of the disk drive. The device has sensor-defeat notches including the alignment notches 30 and 31 and the notches forward of the write enable notch 33 and the high density notch 34. Preferably the member is made of urethane-impregnated felt of a thickness sufficient to provide enough rigidity to allow easy insertion and removal from the drive.

FIGS. 3 and 6 illustrate another alternative embodiment of the invention comprising a member substantially similar to the member shown in FIG. 2. An integrated rigid support structure 40 is attached to the member 11. The rigid support structure is formed in a U-shape inside the outer periphery of the member. The rigid support structure is advantageously positioned on the member to avoid the alignment notches 30 and 31 and the notches forward of the write enable notch 33 and the high density notch 34, the aperture 12, and the head receiving area 14, although, with proper notches cut, the structure could be placed in alignment with the notches. The rigid support structure provides the member with additional stiffness for easier insertion into and removal from the disk drive.

The member and the rigid support structure may be permanently attached with an adhesive, a fastener, or other attaching means such as fusing them together with heat. The member and rigid support structure may also be detachably fastened together to enable a soiled member to be detached from the rigid support structure and discarded The rigid support structure could then be reused by attaching a new member.

Urethane-impregnated felt cloth is the preferred material for the member. This type of material comprises non-woven fibers, held together with urethane or other binding agent such that the material is substantially lint-free. One type of this material is known in the semiconductor wafer manufacturing industry as SUBA, made by Rodel, Newark, Del. and is principally used to polish the silicon wafers before chip fabrication. The cloth's non-woven abrasiveness is appropriate for dislodging and removing debris from the heads of a disk drive without damaging the heads or leaving free fibers. The cloth also has an elasticity which provides a rebound cushioning effect for the heads when they are in contact with the cloth. When air passes through the cloth, particles in the air become entrapped in the cloth's fibers.

This effect allows the cloth to be used as an air filter. Other materials with similar abrasive, cushioning, and air filtration properties may be used.

The device is used by inserting it into a disk drive and leaving it there when ever the drive is not in use. When the device is seated within the drive the heads come into and remain in contact with the member. If the computer then sends a signal to the drive to determine whether a disk is present, the heads will be drawn across the member and cleaned at that time also. The drive's spindle spins within the aperture and does not contact the member such that the device remains stationary within the drive. Thus, possible damage to the heads is avoided by eliminating rotational friction and heat build-up. Additionally, when the heads are drawn across the member they are cleaned in a direction of normal head motion. This method removes debris from the heads more effectively than a rotational cleaner.

In addition to cleaning the heads of the disk drive, the device also protects the heads while they are in contact with the member. The member protects the heads with the rebound cushioning effect of the urethane-impregnated felt cloth. This rebound cushioning effect provides superior protection for the heads than the standard cardboard cutouts that are shipped with many drives.

When left in the drive, the device also filters air entering the drive. The fibers of the urethane-impregnated felt cloth entrap airborne particles entering the drive and prevent the particles from collecting on internal drive components and hindering proper operation of the drive. The device is shaped to substantially fill the receiving area of a disk drive so that air must pass over the member and be filtered as entering the drive. Many computers have cooling fans that draw air through the drive and into the computer, exaggerating the problem of airborne particles. When left in the drive, the device filters air entering both the drive and the computer.

Thus, when left in a disk drive, the device performs several functions. The device automatically cleans the heads each time the drive is inserted or when the computer checks to see if a disk is present. The device protects the heads with a rebound cushioning effect should the drive be moved. And the device filters air that enters the disk drive.

Those skilled in the art will realize that with appropriate shape and size modifications, the device can be adapted to be used in different disk drives for computers, audio, video, or other electronic equipment. The device is especially useful for drives with rotating disks and movable arm heads such as 5.25 inch and 3.5 inch floppy disk drives, compact disk drives, and minidisk drives.

Although certain preferred embodiments have been shown and described, it should be understood that other embodiments and modifications within the scope of the appended claims may be apparent to those of skill in the art.

I claim:

1. A device for a disk drive, comprising:
  a member,
    a) the member adapted for insertion into and removal from the disk drive,
    b) the member adapted to substantially fill the disk drive,
    c) the member having an aperture to avoid contact with a drive spindle of the disk drive when seated within the disk drive,
    d) the member being stationary when seated within the disk drive,
    e) the member constructed substantially entirely of material to clean and cushion at least one head of the disk drive and filter substantially all air entering the disk drive;
    f) the member having notches positioned to defeat disk sensors; and
  whereby the device automatically cleans at least one head of the disk drive each time at least one head is drawn across the member when the drive tests if a disk is present; the device cushions and protects at least one head of the disk drive; and the device filters substantially all air entering the disk drive.

2. The device according to claim 1, wherein the member is a urethane-impregnated felt cloth.

3. The device according to claim 1, wherein the member has an integrated rigid support structure.

4. A device for a disk drive, comprising:
  a rigid support structure adapted for insertion into and removal from the disk drive, the rigid support structure adapted to be seated within the disk drive when inserted into the disk drive, the rigid support structure having notches positioned to defeat disk sensors;
  a member attached to the rigid support structure, the member having an aperture to avoid contact with a drive spindle of the disk drive when seated within the disk drive, the member constructed substantially entirely of material to clean and cushion at least one head of the disk drive and filter substantially all air entering the disk drive;
  whereby the device automatically cleans at least one head of the disk drive each time at least one head is drawn across the member when the drive tests if a disk is present; the device cushions and protects at least one head of the disk drive; and the device filters substantially all air entering the disk drive.

5. The device according to claim 4, wherein the rigid support structure has a base and two narrow side bars forming a U-shape, the base and the narrow side bars having an internal edge, the internal edge of the rigid support structure defining an internal area.

6. The device according to claim 5, wherein the rigid support structure has an outer periphery of substantially similar shape to an outer periphery of a disk jacket adapted for use with the disk drive.

7. The device according to claim 5, wherein the internal edge of the rigid support structure is notched to receive the member.

8. The device according to claim 4, wherein the member substantially fills the internal area of the rigid support structure.

9. The device according to claim 4, wherein the member is a urethane-impregnated felt cloth.

10. The device according to claim 4, wherein the member is permanently attached to the rigid support structure.

* * * * *